US012246767B1

(12) United States Patent
Wan et al.

(10) Patent No.: US 12,246,767 B1
(45) Date of Patent: Mar. 11, 2025

(54) ADJUSTABLE BEACH CART

(71) Applicant: Ningbo Bonsing Outdoor Products Co., Ltd., Zhejiang (CN)

(72) Inventors: Yinxia Wan, Zhejiang (CN); Kaiyong Jia, Zhejiang (CN)

(*) Notice: Subject to any disclaimer, the term of this patent is extended or adjusted under 35 U.S.C. 154(b) by 0 days.

(21) Appl. No.: 18/910,579

(22) Filed: Oct. 9, 2024

(30) Foreign Application Priority Data

Aug. 15, 2024 (CN) .......................... 202411117289.5

(51) Int. Cl.
*B62B 3/02* (2006.01)
*B62B 3/04* (2006.01)
*B62B 5/04* (2006.01)
*B62B 5/06* (2006.01)

(52) U.S. Cl.
CPC .................. *B62B 3/02* (2013.01); *B62B 3/04* (2013.01); *B62B 5/04* (2013.01); *B62B 5/064* (2013.01)

(58) Field of Classification Search
CPC ......... B62B 3/02; B62B 3/04; B62B 2202/22; B62B 2202/52
See application file for complete search history.

(56) References Cited

U.S. PATENT DOCUMENTS

| | | | | |
|---|---|---|---|---|
| 3,815,933 A | * | 6/1974 | Olson | B62B 3/104 280/47.35 |
| 3,858,899 A | * | 1/1975 | Bontrager | B62B 1/208 280/641 |
| 6,113,129 A | * | 9/2000 | Marques | B62B 1/12 280/654 |
| 8,540,255 B2 | * | 9/2013 | Young | B62B 3/10 280/47.35 |
| 8,888,054 B1 | * | 11/2014 | Peterson | B62B 1/266 280/654 |
| 9,452,768 B2 | * | 9/2016 | Fodrocy | B62B 3/005 |
| 9,902,416 B1 | * | 2/2018 | Dockery | B62B 3/02 |
| 10,351,339 B1 | * | 7/2019 | Moens | B65F 1/1468 |
| 2008/0061524 A1 | * | 3/2008 | Goldszer | B62B 3/02 280/47.34 |
| 2021/0362762 A1 | * | 11/2021 | Lawson | C21D 9/46 |
| 2023/0278611 A1 | * | 9/2023 | Schepp | B62B 1/12 280/35 |

FOREIGN PATENT DOCUMENTS

| | | | | |
|---|---|---|---|---|
| DE | 102008015445 A1 | * | 9/2009 | .............. B62B 3/02 |
| EP | 0038872 A2 | * | 11/1981 | |

(Continued)

*Primary Examiner* — Katy M Ebner

(57) ABSTRACT

An adjustable beach cart comprises a cart body, wherein the cart body comprises main body support rods; a bottom of the main body support rod is connected with a loading platform via first connecting pieces, and a top of the main body support rod is provided with an adjustment component; both sides of the adjustment component are respectively provided with a push rod and a suspension support rod; the loading platform comprises a loading support rod and a driving support rod; both ends of the loading support rod are connected to one side of the driving support rod. The adjustable beach cart can be installed with a first net bag through the suspension support rod, and used in conjunction with the loading platform, which greatly increases the loading space. The first net bag is more convenient for loading and taking articles.

9 Claims, 6 Drawing Sheets

(56) References Cited

FOREIGN PATENT DOCUMENTS

| | | | | | |
|---|---|---|---|---|---|
| GB | 2373761 | A | * | 10/2002 | ............. A01K 5/008 |
| GB | 2508195 | A | * | 5/2014 | ............... B62B 1/20 |
| KR | 200445345 | Y1 | * | 7/2009 | |
| KR | 2024106416 | A | * | 7/2024 | ............... B62B 3/04 |
| WO | WO-2012053953 | A1 | * | 4/2012 | ............... B62B 1/12 |

\* cited by examiner

ADJUSTABLE BEACH CART

1. TECHNICAL FIELD

The invention relates to the technical field of beach tools, in particular to an adjustable beach cart.

2. BACKGROUND ART

The main function of a beach cart is to facilitate carrying and transporting items. The design of a beach cart is to help users easily carry items in environments such as beaches. Its features include strong load-bearing capacity, easy operation and portability. Specifically, the role of a beach cart is reflected in the following aspects: 1. strong load-bearing capacity: it can withstand a certain weight, which is very useful for carrying sand tools, children's toys, picnic supplies, etc. on the beach; 2. easy operation: the design of the beach cart makes it simple to carry items, even in the face of complex beach terrain; 3. portability: beach carts are usually designed to be foldable, which is easy to store and carry, and convenient for users to use in different occasions. However, the existing beach carts still have the following shortcomings when used:

Most of the existing beach carts have only one loading platform for placing boxes, and the loading space is small. In addition, the existing beach carts have wheels on only one side, and the other side is supported by a bracket. Although this design can increase the stability of the beach cart when it is parked, it is necessary to lift the front of the cart when moving, which is more laborious to use and the use effect is not ideal.

3. SUMMARY OF THE INVENTION

In order to achieve the above purpose, the invention provides the following technical solutions: an adjustable beach cart, comprising a cart body, wherein the cart body comprises main body support rods; a bottom of the main body support rod is connected with a loading platform via first connecting pieces, and a top of the main body support rod is provided with an adjustment component; both sides of the adjustment component are respectively provided with a push rod and a suspension support rod;

the loading platform comprises a loading support rod and a driving support rod; both ends of the loading support rod are connected to one side of the driving support rod, and both ends of the driving support rod are provided with beach wheels; an inside of the loading support rod is provided with a plurality of reinforcing support rods, and a plurality of universal wheels is provided on the bottom of the loading support rod.

the adjustment component comprises a fixing rod, and both ends of the fixing rod are provided with adjustment seats; each end is respectively connected to an adjustment seat by a first connecting shaft and each end of a push rod is respectively connected to an adjustment seat by a second connecting shaft, apart from the first connecting shaft. and both ends of the push rod extend into an interior of the two adjustment seats respectively and are movably connected to the adjustment seats via the second connecting shaft.

Preferably, an interior of one side of the adjustment seat located on the main body support rod is provided with a plurality of first adjustment holes; a plurality of the first adjusting holes form an arc, and the center of the arc coincides with the center of the first connecting shaft, and an interior of one of the first adjustment holes is provided with a first positioning pin that is sleeved with an interior of one end of the suspension support rod.

Preferably, an interior of one side of the adjustment seat located on the main body support rod is provided with a plurality of second adjustment holes; a plurality of the second adjusting holes form an arc, and the center of the arc coincides with the center of the second connecting shaft, and an interior of one of the second adjustment holes is provided with a second positioning pin that is sleeved with an interior of one end of the push rod.

Preferably, the push rod, the suspension support rod, and the loading support rod are all U-shaped; both adjustment seats are each provided with a sleeve on opposite sides thereof, and the two sleeves are respectively sleeved with two ends of the fixing rod and fixed by screws.

Preferably, corners of both ends of one side of the loading support rod are provided with stabilizing pieces, and a top of the stabilizing piece is provided with a triangular stabilizing platform; the number of the universal wheels is two, and the two universal wheels are respectively provided at a bottom of the two stabilizing pieces.

Preferably, the first connecting piece is triangular and each of the three sides of the first connecting piece corresponding to the triangle is provided with at least one first reinforcing rib; both ends of the reinforcing support rod are provided with a second connecting piece, and one end of the second connecting piece away from the reinforcing support rod is provided with a first U-shaped groove; one end of the reinforcing support rod is clamped with the loading support rod via the first U-shaped groove and fixed via screws, and the other end of the reinforcing support rod is connected with a cross support rod via the first U-shaped groove.

Preferably, both ends of the cross support rod are provided with fourth connecting pieces; a bottom of the second connecting piece is provided with at least one second reinforcing rib; both ends of the loading support rod are provided with a T-shaped third connecting piece that is sleeved with the driving support rod; both sides of the third connecting piece are provided with at least one third reinforcing rib.

Preferably, one end of the fourth connecting piece away from the cross support rod is provided with a second U-shaped groove; both ends of the cross support rod are respectively clamped with the loading support rod via the second U-shaped groove and fixed by screws; a bottom of the fourth connecting piece is provided with at least one fourth reinforcing rib.

Preferably, both ends of the driving support rod are movably provided with wheel hubs, and the two beach wheels are respectively arranged on the two wheel hubs; the universal wheel is provided with a brake; the diameter of the beach wheel is greater than the diameter of the universal wheel.

Preferably, both sides of the adjustment seat are provided with at least one fifth reinforcing rib; one end of the first positioning pin is provided with a first connecting rope, and one end of the first connecting rope away from the first positioning pin is fixedly connected to one side of the adjustment seat; one end of the second positioning pin is provided with a second connecting rope, and one end of the second connecting rope away from the second positioning pin is fixedly connected to one side of the adjustment seat.

Compared with the prior art, the invention provides an adjustable beach cart, which has the following beneficial effects.

The adjustable beach cart can be installed with a first net bag through the suspension support rod, and used in conjunction with the loading platform, which greatly increases the loading space. The first net bag is more convenient for loading and taking articles. The setting of a second net bag will not affect the use of space on the loading platform, and an additional loading space is added, which further ensures the transportation space of the adjustable beach cart. The design of the universal wheels, used in conjunction with the beach wheels, makes the beach cart more convenient to move and more flexible to turn.

4. BRIEF DESCRIPTION OF ACCOMPANY DRAWINGS

Figure 1:
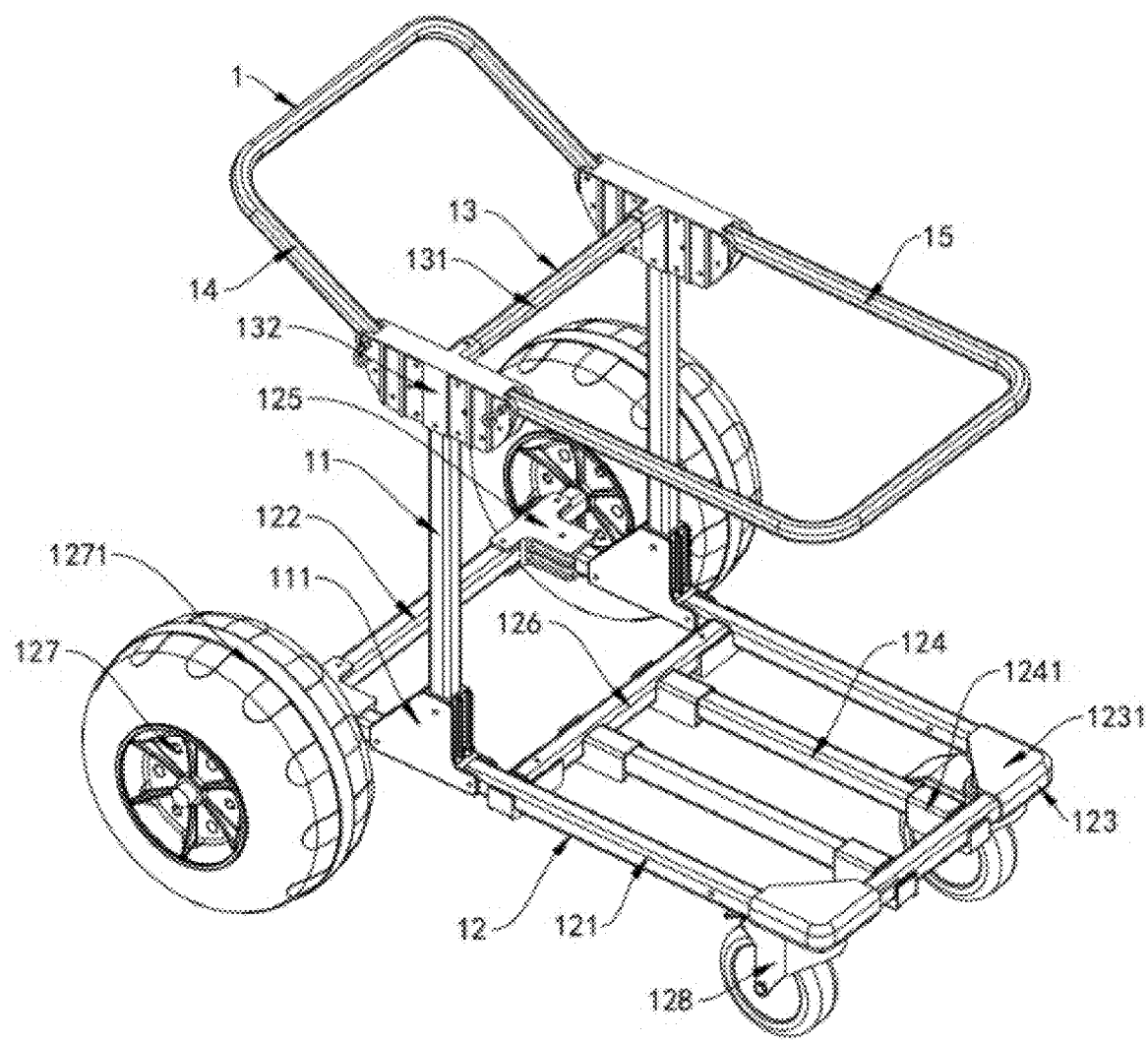
FIG. 1 is a schematic diagram of the structure of the adjustable beach cart according to the invention.
Figure 2:
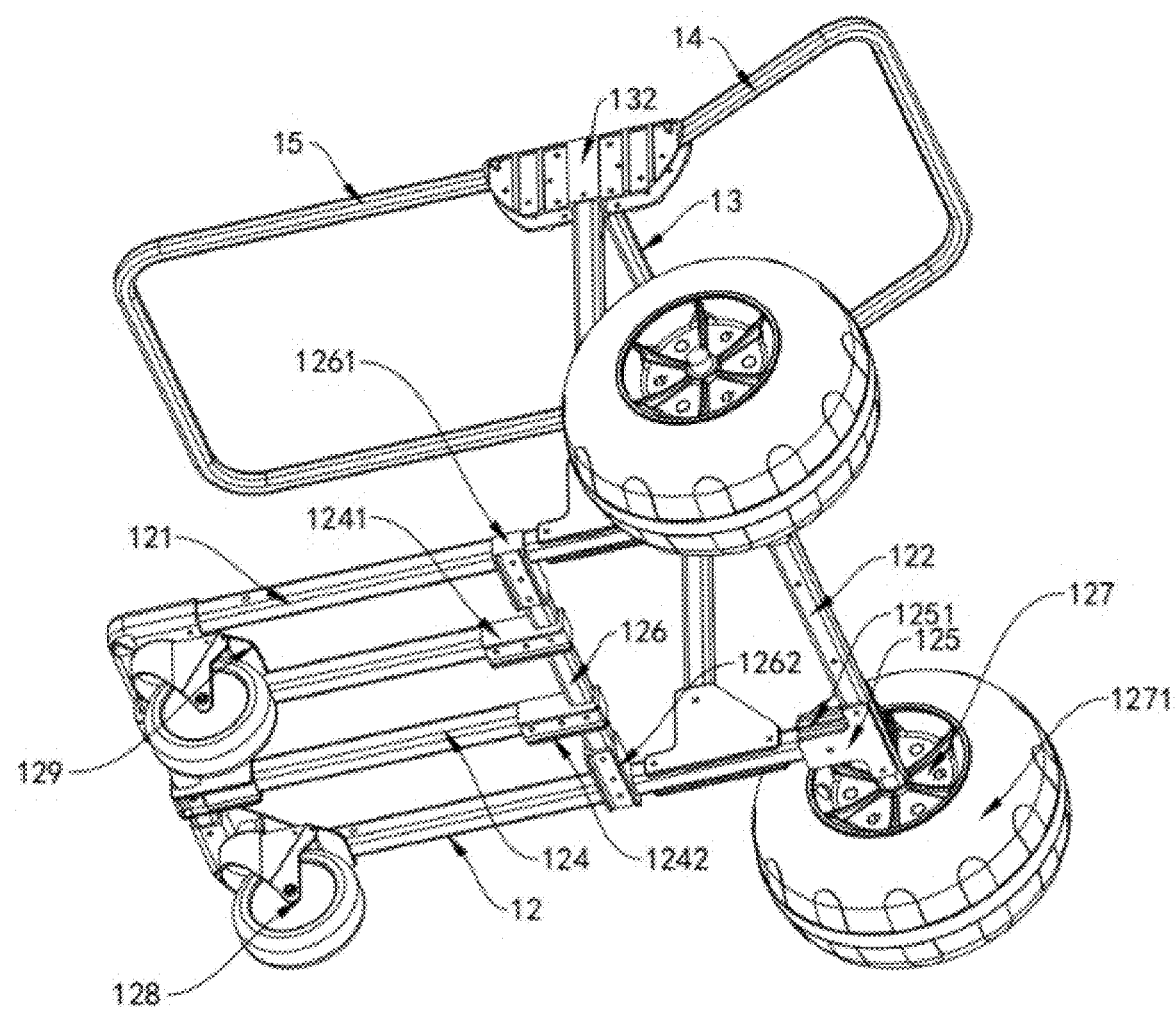
FIG. 2 is a schematic diagram of the structure of the universal wheel in the adjustable beach cart according to the invention.
Figure 3:
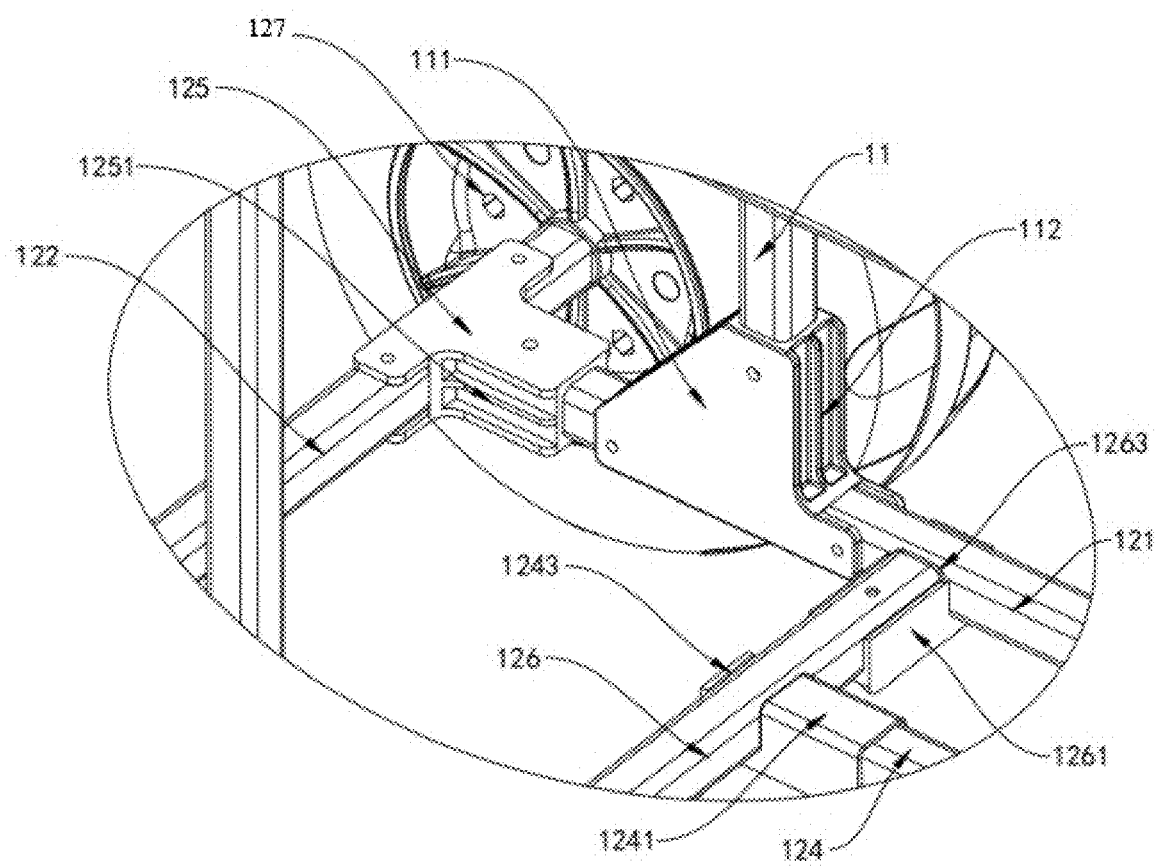
FIG. 3 is a schematic diagram of the structure of the first connecting piece in the adjustable beach cart according to the invention.

In the figures: 1 refers to the cart body; 11 refers to the main body support rod; 111 refers to the first connecting piece; 112 refers to the first reinforcing rib; 12 refers to the loading platform; 121 refers to the loading support rod; 122 refers to the driving support rod; 123 refers to the stabilizing piece; 1231 refers to the stabilizing platform; 124 refers to the reinforcing support rod; 1241 refers to the second connecting piece; 1242 refers to the second reinforcing rib; 1243 refers to the first U-shaped groove; 125 refers to the third connecting piece; 1251 refers to the third reinforcing rib; 126 refers to the cross support rod; 1261 refers to the fourth connecting piece; 1262 refers to the fourth reinforcing rib; 1263 refers to the second U-shaped groove; 127 refers to the wheel hub; 1271 refers to the beach wheel; 128 refers to the universal wheel; 129 refers to the brake; 13 refers to the adjustment component; 131 refers to the fixing rod; 132 refers to the adjustment seat; 1321 refers to the sleeve; 133 refers to the fifth reinforcing rib; 134 refers to the first connecting shaft; 135 refers to the second connecting shaft; 136 refers to the first adjustment hole; 137 refers to the first positioning pin; 1371 refers to the first connecting rope; 138 refers to the second adjustment hole; 139 refers to the second positioning pin; 1391 refers to the second connecting rope; 14 refers to the push rod; 15 refers to the suspension support rod; 2 refers to the first net bag; 3 refers to the second net bag.

5. SPECIFIC EMBODIMENT OF THE INVENTION

In order to make the objectives, technical solutions, and advantages of the embodiments of the invention clearer, the technical solutions in the embodiments of the invention will be described clearly and completely hereinafter with reference to the drawings in the embodiments of the invention. Obviously, the described embodiments are part of the embodiments of the invention, rather than all of the embodiments. The components of the embodiments of the invention generally described and illustrated in the drawings herein may be arranged and designed in various different configurations.

The terms "first", "second", etc. in the specification and claims of the embodiments of the invention and the above drawings are used to distinguish similar objects, and are not necessarily used to describe a specific order or sequence. It should be understood that the terms used in this way can be interchanged where appropriate. In addition, the terms "including" and "comprising" and any variations thereof are intended to cover non-exclusive inclusions.

In the description of the invention, it needs to be understood that the orientation or positional relationship indicated by the terms "center", "up", "down", "left", "right", "vertical", "horizontal", "inner", "outer", etc. are based on the orientation or positional relationship shown in the drawings, which are only for the convenience of describing the invention and simplifying the description, rather than indicating or implying that the device or element referred to must have a specific orientation, be constructed and operated in a specific orientation, and therefore cannot be understood as a limitation of the invention.

In the invention, unless otherwise clearly defined and limited, the terms "provided", "installed", "connected" and other terms should be interpreted broadly; for example, it can be a fixed connection, it can be a detachable connection, or integrated; it can be a mechanical connection or an electrical connection; it can be a direct connection, or an indirectly connection through an intermediate medium, and it can be an internal communication between two elements or the interaction relationship between two elements. For those of ordinary skill in the art, the specific meaning of the above terms in the invention can be understood according to specific circumstances.

In the description of the invention, "plurality" means at least two.

It should be noted that, in the absence of conflict, the embodiments and features in the embodiments of the invention may be combined with each other.

Embodiment 1: with reference to FIGS. 1-5, an adjustable beach cart, comprising a cart body 1, wherein the cart body 1 comprises main body support rods 11; a bottom of the main body support rod 11 is connected with a loading platform 12 via first connecting pieces 111, and a top of the main body support rod 11 is provided with an adjustment component 13; both sides of the adjustment component 13 are respectively provided with a push rod 14 and a suspension support rod 14.

The loading platform 12 comprises a loading support rod 121 and a driving support rod 122; both ends of the loading support rod 121 are connected to one side of the driving support rod 122, and both ends of the driving support rod 122 are provided with beach wheels 1271; an inside of the loading support rod 121 is provided with a plurality of reinforcing support rods 124, and a plurality of universal wheels 128 is provided on the bottom of the loading support rod 121.

The adjustment component 13 comprises a fixing rod 131, and both ends of the fixing rod 131 are provided with adjustment seats 132; each end is respectively connected to an adjustment seat by a first connecting shaft 134 and each end of a push rod 14 is respectively connected to an adjustment seat by a second connecting shaft 135, apart from the first connecting shaft 134. and both ends of the push rod 14 extend into an interior of the two adjustment seats 132 respectively and are movably connected to the adjustment seats 132 via the second connecting shaft 135. The number of the main support rods is two; bottoms of the two main support rods 11 are connected to tops of both sides of the loading support rod 121 through first connecting pieces 111, and tops of the two main support rods 11 are fixedly connected to insides of the two adjustment seats 132 through screws.

Specifically, an interior of one side of the adjustment seat 132 located on the main body support rod 11 is provided with a plurality of first adjustment holes 136; a plurality of the first adjusting holes 136 form an arc, and the center of the arc coincides with the center of the first connecting shaft 134, and an interior of one of the first adjustment holes 136 is provided with a first positioning pin 137 that is sleeved with an interior of one end of the suspension support rod 15.

Figure 4:
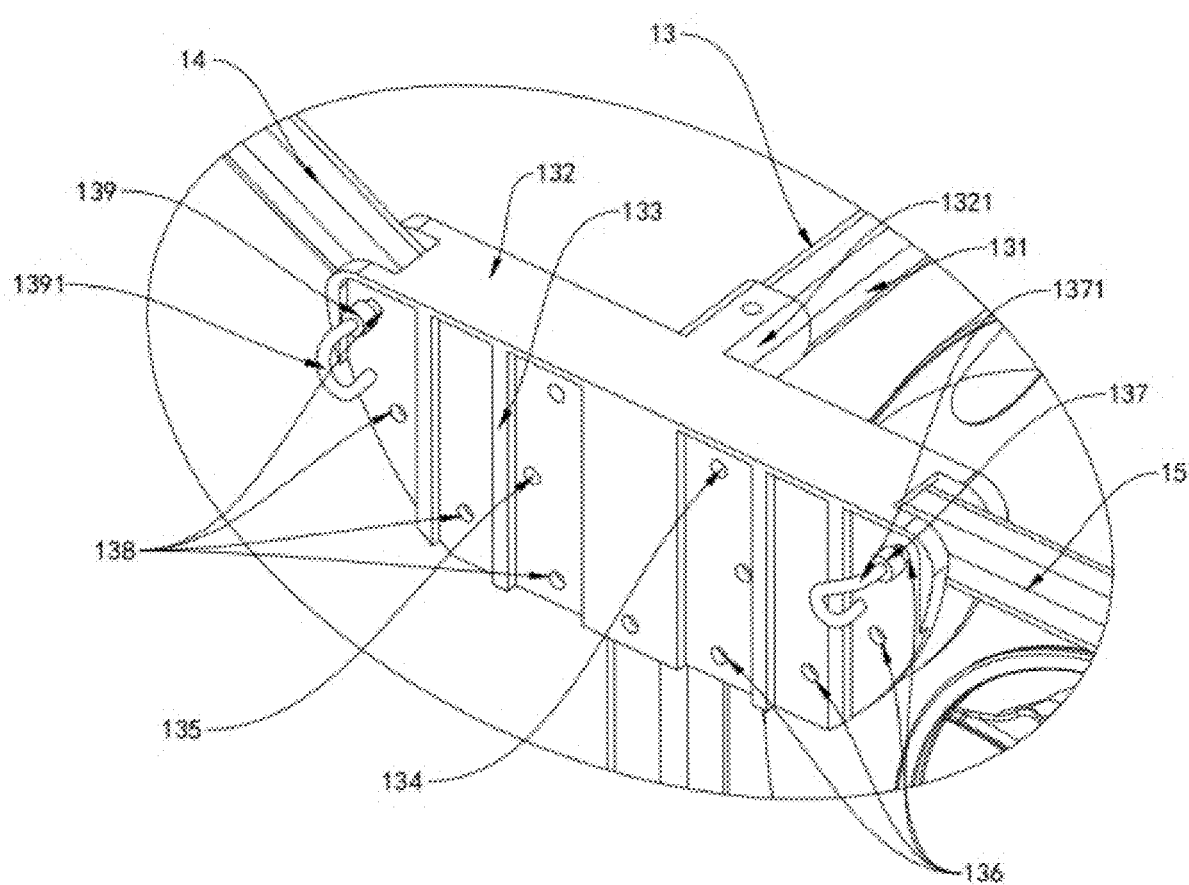
FIG. 4 is a schematic diagram of the structure of the adjustment seat in the adjustable beach cart according to the invention.
Figure 5:
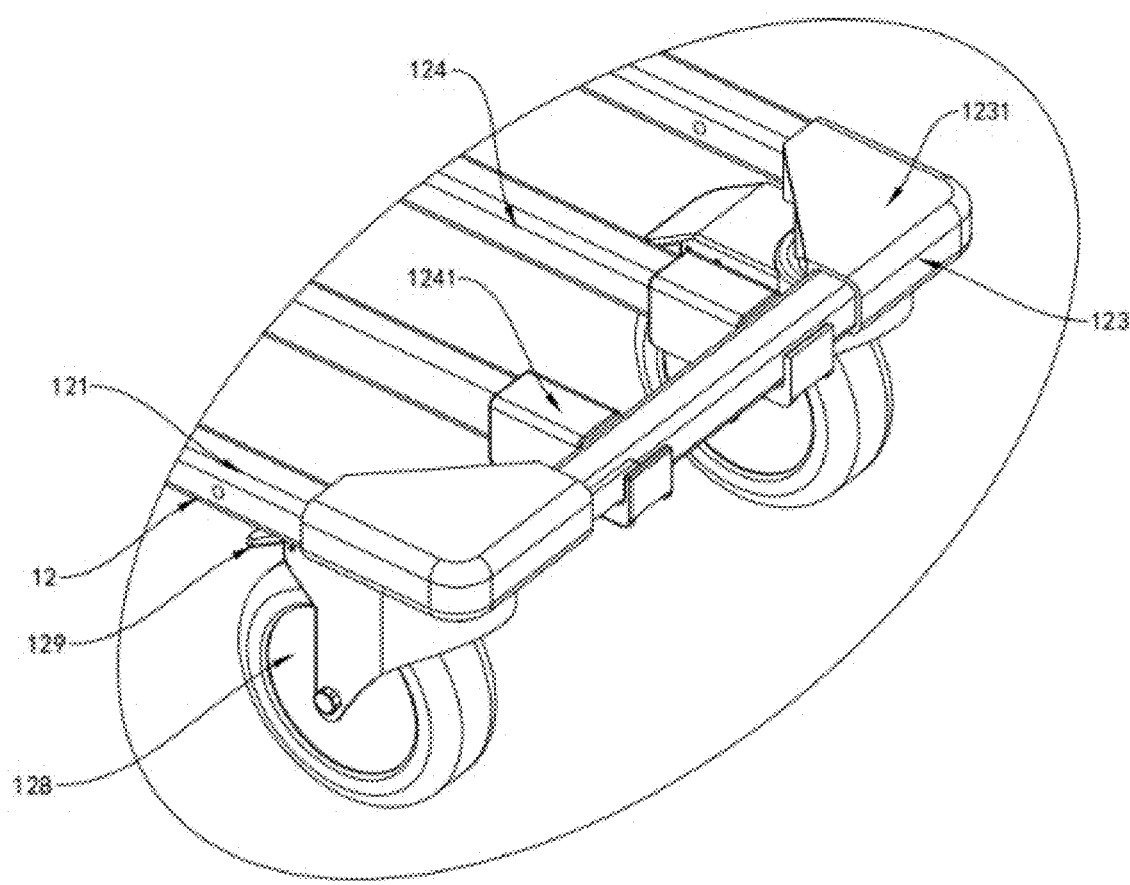
FIG. 5 is a schematic diagram of the structure of the stabilizing piece in the adjustable beach cart according to the invention.
Figure 6:
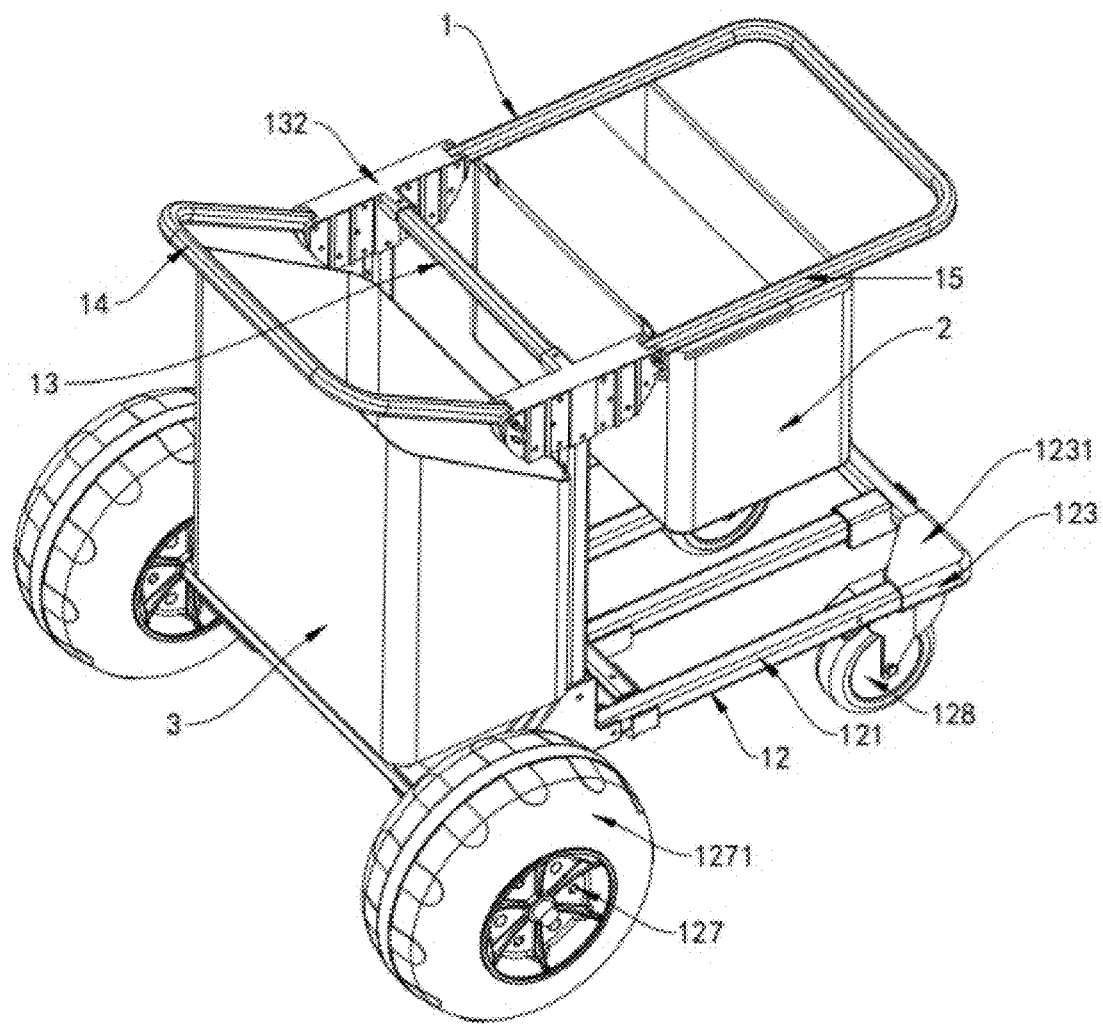
FIG. 6 is a schematic diagram of the structure of Embodiment 2 of the adjustable beach cart according to the invention.

In the embodiment, with reference to FIG. 4, the suspension support rod 15 is in a state of being parallel to the loading platform 12. When the angle of the suspension support rod 15 needs to be adjusted, after pulling out the first positioning pin 137 from the inside of the first adjustment hole 136 and the inside of the suspension support rod 15, the suspension support rod 15 is free from restriction, and the suspension support rod 15 can be moved to match the angles with the multiple first adjustment holes 136; after the angle is selected, inserting the first positioning pin 137 into the corresponding adjustment hole 136 and the inside of the suspension support rod 15 to complete the positioning of the suspension support rod 15.

Specifically, an interior of one side of the adjustment seat 132 located on the main body support rod 11 is provided with a plurality of second adjustment holes 138; a plurality of the second adjusting holes 138 form an arc, and the center of the arc coincides with the center of the second connecting shaft 135, and an interior of one of the second adjustment holes 138 is provided with a second positioning pin 139 that is sleeved with an interior of one end of the push rod 14.

In the embodiment, with reference to FIG. 4, the push rod 14 is in a tilted upward state, suitable for users with taller heights. Users of different heights can adjust the angle of the push rod 14 to adapt. After pulling out the second positioning pin 139 from the inside of the second adjustment hole 138 and the inside of the push rod 14, the push rod 14 is freed from restriction, and the push rod 14 can be moved relative to multiple second adjustment holes 138 for angle adaptation. After the angle is selected, inserting the second positioning pin 139 into the corresponding adjustment hole 138 and the inside of the push rod 14 to complete the positioning of the push rod 14.

Specifically, the push rod 14, the suspension support rod 15, and the loading support rod 121 are all U-shaped; both adjustment seats 132 are each provided with a sleeve 1321 on opposite sides thereof, and the two sleeves 1321 are respectively sleeved with two ends of the fixing rod 131 and fixed by screws.

In the embodiment, the U-shaped push rod 14, the suspension support rod 15, and the loading support rod 121 are integrally formed and have high structural strength, thereby ensuring the overall structural strength and stability of the cart. The sleeve and the fixing rod 131 are connected by screws, which facilitates later disassembly and assembly and makes maintenance more convenient.

Specifically, corners of both ends of one side of the loading support rod 121 are provided with stabilizing pieces 123, and a top of the stabilizing piece 123 is provided with a triangular stabilizing platform 1231; the number of the universal wheels 128 is two, and the two universal wheels 128 are respectively provided at a bottom of the two stabilizing pieces 123.

In the embodiment, the setting of the stabilizing piece 123 can not only be used to install the universal wheels 128, but also can increase the supporting area for the objects in combination with the triangular stabilizing platform 1231, thereby ensuring the stability of the load and preventing the objects from falling. The design of the universal wheels 128 makes the beach cart more flexible to move and more convenient to turn.

Specifically, the first connecting piece 111 is triangular and each of the three sides of the first connecting piece 111 corresponding to the triangle is provided with at least one first reinforcing rib 112; both ends of the reinforcing support rod 124 are provided with a second connecting piece 1241, and one end of the second connecting piece 1241 away from the reinforcing support rod 124 is provided with a first U-shaped groove 1243; one end of the reinforcing support rod 124 is clamped with the loading support rod 232 via the first U-shaped groove 1243 and fixed via screws, and the other end of the reinforcing support rod 124 is connected with a cross support rod 126 via the first U-shaped groove 1243.

In the embodiment, the triangular first connecting piece 111 ensures the connection stability between the main support rod 11 and the loading support rod 121. The first reinforcing ribs 112 on the three sides of the first connecting piece 111 ensure the structural strength of the first connecting piece 111, and further increase the connection stability between the main support rod 11 and the loading support rod 121. The first connecting piece 111 is fixed to the main support rod 11 and the loading support rod 121 by screws, which facilitates later disassembly and assembly, and is more convenient to use. The setting of the second connecting piece 1241 is matched with the first U-shaped groove 1243 to connect with the loading support rod 121 and the cross support rod 126, and strengthens the setting of the support rod 124, which is used to be matched with the loading support rod 121 to support the objects, while ensuring the overall structural strength of the loading platform 12.

Specifically, both ends of the loading support rod 121 are provided with a T-shaped third connecting piece 125 that is sleeved with the driving support rod 122; both ends of the cross support rod 126 are provided with fourth connecting pieces 1261; a bottom of the second connecting piece 1241 is provided with at least one second reinforcing rib 1242; both sides of the third connecting piece 125 are provided with at least one third reinforcing rib 1251.

In the embodiment, the cross support rod 126 is provided to be matched with the loading support rod 121 and the reinforcing support rod 124 to support the objects, while ensuring the structural strength of the loading platform 12; the T-shaped design of the third connecting piece 125 ensures the vertical stability of the two ends of the loading support rod 121 and the driving support rod 122; and the third connecting piece 125 is fixed to the loading support rod 121 and the driving support rod 122 by screws, which makes it more convenient for later disassembly and assembly; the setting of the third reinforcing rib 1251 ensures the structural strength of the third connecting piece 125 and the connection stability of the loading support rod 121 and the driving support rod 122; the setting of the second reinforcing rib 1242 ensures the structural strength of the second connecting piece 1241 and the connection stability of the reinforcing support rod 124 and the loading support rod 121.

Specifically, one end of the fourth connecting piece 1261 away from the cross support rod 126 is provided with a second U-shaped groove 1263; both ends of the cross support rod 126 are respectively clamped with the loading support rod 121 via the second U-shaped groove 1263 and fixed by screws; a bottom of the fourth connecting piece 1261 is provided with at least one fourth reinforcing rib 1262.

In the embodiment, the setting of the fourth reinforcing rib 1262 ensures the structural strength of the fourth connecting piece 1261, while ensuring the connection stability between the cross support rod 126 and the loading support rod 121. Both ends of the cross support rod 126 are respectively connected to the loading support rod 121 through the second U-shaped groove 1263 and fixed by screws, which facilitates later disassembly and assembly and is more convenient to use.

Specifically, both ends of the driving support rod 122 are movably provided with wheel hubs 127, and the two beach wheels 1271 are respectively arranged on the two wheel hubs 127; the universal wheel 128 is provided with a brake 129; the diameter of the beach wheel 1271 is greater than the diameter of the universal wheel 128.

In the embodiment, the diameter of the beach wheel 1271 is greater than the diameter of the universal wheel 128, which is more suitable for beach scenes; together with the flexible universal wheels 128, the adjustable beach cart is more flexible to use and easier to push.

Specifically, both sides of the adjustment seat 132 are provided with at least one fifth reinforcing rib 133; one end of the first positioning pin 137 is provided with a first connecting rope 1371, and one end of the first connecting rope 1371 away from the first positioning pin 137 is fixedly connected to one side of the adjustment seat 132; one end of the second positioning pin 139 is provided with a second connecting rope 1391, and one end of the second connecting rope 1391 away from the second positioning pin 139 is fixedly connected to one side of the adjustment seat 132.

In the embodiment, the setting of the fifth reinforcing ribs 133 ensures the overall structural strength of the adjustment seat 132. The setting of the first connecting rope 1371 ensures that after the first positioning pin 137 is pulled out, it will not fall off, but will naturally hang on one side of the adjustment seat 132, making it more convenient to use again. The setting of the second connecting rope 1391 ensures that after the second positioning pin 139 is pulled out, it will not fall off, but will naturally hang on one side of the adjustment seat 132, making it more convenient to use again.

Embodiment 2: with reference to FIGS. 1-6, compared with the above embodiment, the embodiment further comprises a first net bag 2 and a second net bag 3. The first net bag 2 is installed on the suspension support rod 15, and the second net bag 3 is installed on one side of the main support rod 11 away from the loading platform 12. The first net bag 2 can be used for placing objects, which can be more convenient to take out. When transporting a small amount of objects, the use of boxes can be reduced, and transportation is more convenient. The setting of the second net bag 3 will not affect the use of space on the loading platform 12, and an additional loading space is added, which further ensures the transportation space of the adjustable beach cart.

When in use, the loading platform 12 can prevent the box from being loaded with objects, or can directly place objects. When the box is large, the suspension support rod 15 is folded to be parallel to the main support rod 11. With reference to FIG. 4, the suspension support rod 15 is in a state of being parallel to the loading platform 12. When the angle of the suspension support rod 15 needs to be adjusted, after pulling out the first positioning pin 137 from the inside of the first adjustment hole 136 and the inside of the suspension support rod 15, the suspension support rod 15 is free from restriction, and the suspension support rod 15 can be moved to match the angles with the multiple first adjustment holes 136. Adjust the angle of the suspension support rod 15 to be close to and parallel to the main support rod 11 without affecting the use of the box. Insert the first positioning pin 137 into the corresponding adjustment hole 136 and the inside of the suspension support rod 15 to complete the positioning of the suspension support rod 15. When the height of the box is low and does not affect the use of the suspension support rod 15 with the first net bag 2, there is no need to adjust the angle of the suspension support rod 15.

With reference to FIG. 4, the push rod 14 is in a tilted upward state, suitable for users with taller heights. Users of different heights can adjust the angle of the push rod 14 to adapt. After pulling out the second positioning pin 139 from the inside of the second adjustment hole 138 and the inside of the push rod 14, the push rod 14 is freed from restriction, and the push rod 14 can be moved relative to multiple second adjustment holes 138 for angle adaptation. After the angle is selected, inserting the second positioning pin 139 into the corresponding adjustment hole 138 and the inside of the push rod 14 to complete the positioning of the push rod 14.

In summary, the adjustable beach cart can be installed with a first net bag 2 through the suspension support rod 15, and used in conjunction with the loading platform 12, which greatly increases the loading space. The first net bag 2 is more convenient for loading and taking articles. The setting of a second net bag 3 will not affect the use of space on the loading platform 12, and an additional loading space is added, which further ensures the transportation space of the adjustable beach cart. The design of the universal wheels 128, used in conjunction with the beach wheels 1271, makes the beach cart more convenient to move and more flexible to turn.

The invention and the embodiments thereof are described hereinabove, and this description is not restrictive. What is shown in the drawings is only one of the embodiments of the invention, and the actual structure is not limited thereto. All in all, structural methods and embodiments similar to the technical solution without deviating from the purpose of the invention made by those of ordinary skill in the art without creative design shall all fall within the protection scope of the invention.

The invention claimed is:

1. An adjustable beach cart, comprising: a cart body, wherein the cart body comprises main body support rods; a bottom of each main body support rod is connected with a loading platform via a first connecting piece, and a top of each main body support rod is provided with an adjustment component; both sides of the adjustment component are respectively provided with a push rod and a suspension support rod;

the loading platform comprises a loading support rod and a driving support rod; both ends of the loading support rod are connected to one side of the driving support rod, and both ends of the driving support rod are provided with beach wheels; an inside of the loading support rod is provided with a plurality of reinforcing support rods, a plurality of universal wheels is provided on the bottom of the loading support rod;

the adjustment component comprises a fixing rod, and both ends of the fixing rod are provided with adjustment seats; each end of the suspension support rod is respectively connected to an adjustment seat by a first connecting shaft and each end of a push rod is respectively connected to an adjustment seat by a second connecting shaft, apart from the first connecting shaft, and both ends of the push rod extend into an interior of the two adjustment seats respectively and are movably connected to the adjustment seats via the second connecting shaft;

an interior of one side of the adjustment seat located on the main body support rod is provided with a plurality of first adjustment holes, a plurality of the first adjusting holes form an arc, the center of the arc coincides with the center of the first connecting shaft, and an interior of one of the first adjustment holes is provided with a first positioning pin that is sleeved with an interior of one end of the suspension support rod.

2. The adjustable beach cart of claim 1, wherein an interior of one side of the adjustment seat located on the main body support rod is provided with a plurality of second adjustment holes; a plurality of the second adjusting holes form an arc, and the center of the arc coincides with the center of the second connecting shaft, and an interior of one of the second adjustment holes is provided with a second positioning pin that is sleeved with an interior of one end of the push rod.

3. The adjustable beach cart of claim 1, wherein the push rod, the suspension support rod, and the loading support rod are all U-shaped; both adjustment seats are each provided with a sleeve on opposite sides thereof, and the two sleeves are respectively sleeved with two ends of the fixing rod and fixed by screws.

4. The adjustable beach cart of claim 1, wherein corners of both ends of one side of the loading support rod are provided with stabilizing pieces, and a top of the stabilizing piece is provided with a triangular stabilizing platform; the number of the universal wheels is two, and the two universal wheels are respectively provided at a bottom of the two stabilizing pieces.

5. The adjustable beach cart of claim 1, wherein the first connecting piece is triangular and each of the three sides of the first connecting piece corresponding to the triangle is provided with at least one first reinforcing rib; both ends of the reinforcing support rod are provided with a second connecting piece.

6. The adjustable beach cart of claim 5, wherein both ends of the cross support rod are provided with fourth connecting pieces; a bottom of the second connecting piece is provided with at least one second reinforcing rib; both ends of the loading support rod are provided with a T-shaped third connecting piece that is sleeved with the driving support rod; both sides of the third connecting piece are provided with at least one third reinforcing rib.

7. The adjustable beach cart of claim 6, wherein one end of the fourth connecting piece away from the cross support rod is provided with a second U-shaped groove; a bottom of the fourth connecting piece is provided with at least one fourth reinforcing rib.

8. The adjustable beach cart of claim 1, wherein both ends of the driving support rod are movably provided with wheel hubs, and the two beach wheels are respectively arranged on the two wheel hubs; the universal wheels are provided with brakes; the diameter of the beach wheel is greater than the diameter of the universal wheel.

9. The adjustable beach cart of claim 1, wherein both sides of the adjustment seat are provided with at least one fifth reinforcing rib; one end of the first positioning pin is provided with a first connecting rope, and one end of the first connecting rope away from the first positioning pin is fixedly connected to one side of the adjustment seat; one end of the second positioning pin is provided with a second connecting rope, and one end of the second connecting rope away from the second positioning pin is fixedly connected to one side of the adjustment seat.

* * * * *